(12) United States Patent
Stinessen

(10) Patent No.: US 9,728,968 B2
(45) Date of Patent: Aug. 8, 2017

(54) DEVICE FOR STABLE SUBSEA ELECTRIC POWER TRANSMISSION TO RUN SUBSEA HIGH SPEED MOTORS OR OTHER SUBSEA LOADS

(75) Inventor: Kjell Olav Stinessen, Oslo (NO)

(73) Assignee: Aker Subsea AS, Lysaker (NO)

( * ) Notice: Subject to any disclaimer, the term of this patent is extended or adjusted under 35 U.S.C. 154(b) by 714 days.

(21) Appl. No.: 14/240,932

(22) PCT Filed: Sep. 11, 2012

(86) PCT No.: PCT/NO2012/050174
§ 371 (c)(1),
(2), (4) Date: Feb. 25, 2014

(87) PCT Pub. No.: WO2013/039404
PCT Pub. Date: Mar. 21, 2013

(65) Prior Publication Data
US 2014/0203640 A1    Jul. 24, 2014

(30) Foreign Application Priority Data
Sep. 12, 2011 (NO) .................................. 20111233

(51) Int. Cl.
H02J 3/22 (2006.01)
H02P 5/74 (2006.01)
H02M 5/32 (2006.01)

(52) U.S. Cl.
CPC ................. *H02J 3/22* (2013.01); *H02M 5/32* (2013.01); *H02P 5/74* (2013.01); *Y10T 307/406* (2015.04)

(58) Field of Classification Search
CPC ..................................... H02J 3/22; H02M 5/32
See application file for complete search history.

(56) References Cited

U.S. PATENT DOCUMENTS 6,023,152 A    2/2000   Briest et al.
7,578,436 B1   8/2009   Kiliccote
(Continued)

FOREIGN PATENT DOCUMENTS

EP    1840814 A1    10/2007
FR    2852471 A1    9/2004
(Continued)

OTHER PUBLICATIONS

Baggerud, Erik et al., "Technical Status and Development Needs for Subsea Gas Compression", Offshore Technology Conference, 2007 (10 pages).
(Continued)

*Primary Examiner* — Jeffrey Shin
(74) *Attorney, Agent, or Firm* — Winstead PC

(57) ABSTRACT

The invention provides a device for operative connection between a subsea step out cable far end and subsea loads such as pumps, compressors and control systems, distinctive in that the device is a rotating frequency stepper device, more specifically a rotating step up or step down device, and it comprises: a motor and a generator operatively connected so that the motor drives the generator, at least one gas and/or liquid filled vessel into which at least one of the motor and generator are arranged, and the step out length is long, which means long enough to cause problems due to the Ferranti effect at frequency and power levels feasible for subsea pump and compressor motors, and where the device via the step out cable receives input electrical power at a low enough frequency to have stable transmission and the device, operatively connected to the subsea motor, delivers an output electrical frequency, amperage and voltage feasible for operation of the connected motors. System for pressure boosting of hydrocarbon fluid or other fluid subsea, comprising the device.

15 Claims, 7 Drawing Sheets

(56) References Cited

U.S. PATENT DOCUMENTS

Figure 1:
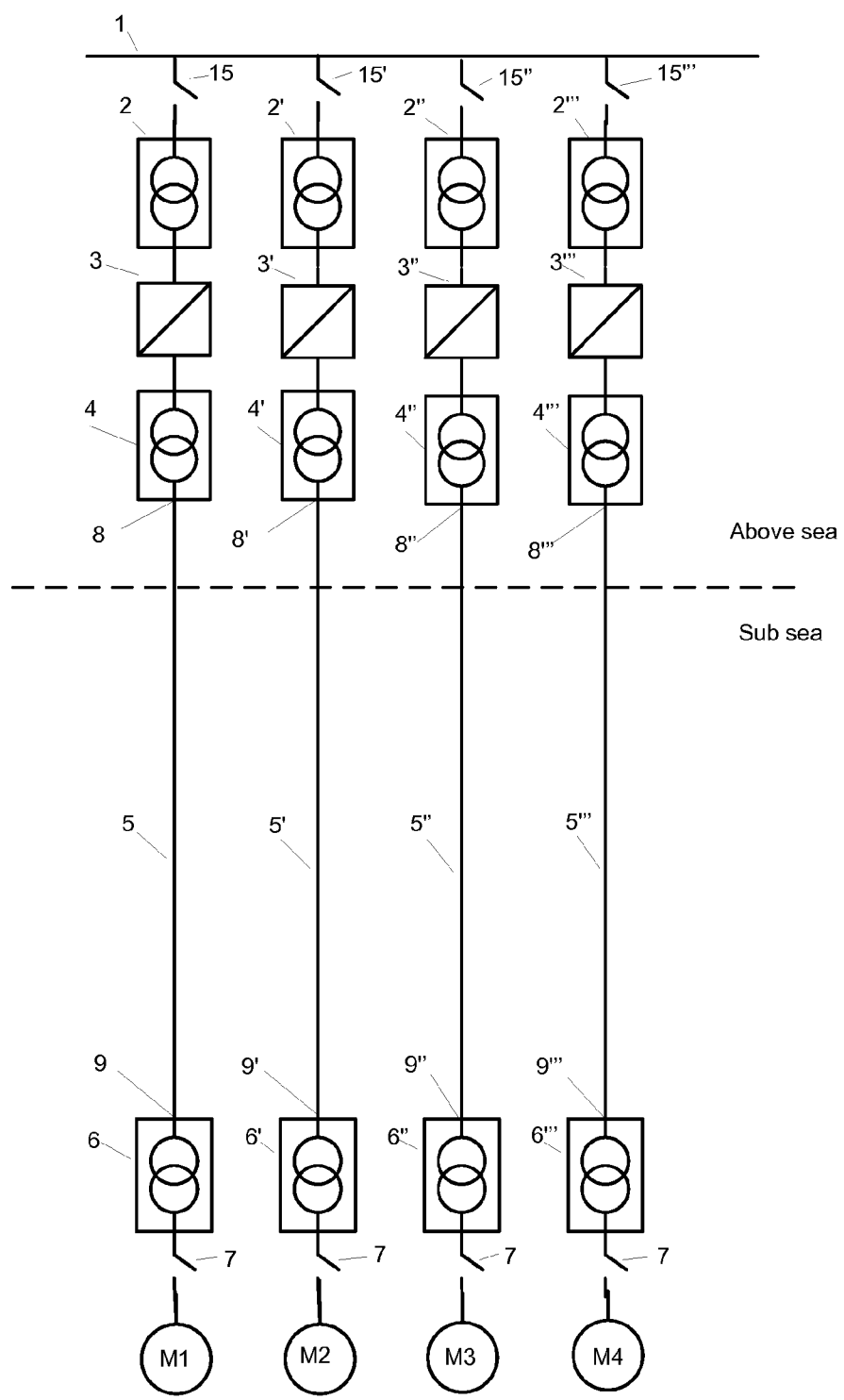

| | | | |
|---|---|---|---|
| 2003/0155127 A1 | 8/2003 | Carlsen | |
| 2008/0088131 A1 | 4/2008 | Thisted | |
| 2010/0019573 A1 | 1/2010 | Biester et al. | |
| 2010/0206554 A1* | 8/2010 | Neuhaus | E21B 4/04 166/244.1 |
| 2010/0288501 A1 | 11/2010 | Fielder et al. | |
| 2012/0217802 A1* | 8/2012 | Kanakasabai | H02J 3/36 307/32 |
| 2014/0197764 A1 | 7/2014 | Stinessen | |

FOREIGN PATENT DOCUMENTS

| | | |
|---|---|---|
| GB | 2448928 A | 11/2008 |
| WO | WO-01/26201 A1 | 4/2001 |
| WO | WO-0156352 A2 | 8/2001 |
| WO | WO-01/69754 A1 | 9/2001 |
| WO | WO-2006059124 A1 | 6/2006 |
| WO | WO-2009/015670 A1 | 2/2009 |
| WO | WO-2009/115895 A1 | 9/2009 |
| WO | WO-2009134213 A2 | 11/2009 |
| WO | WO-2011029566 A1 | 3/2011 |

OTHER PUBLICATIONS

Fæster, Arne, "International Search Report," prepared for PCT/NO2012/050174, as mailed Nov. 29, 2012, 3 pages.

* cited by examiner

DEVICE FOR STABLE SUBSEA ELECTRIC POWER TRANSMISSION TO RUN SUBSEA HIGH SPEED MOTORS OR OTHER SUBSEA LOADS

FIELD OF THE INVENTION

The present invention relates to equipment for subsea production of petroleum, particularly equipment located far away from dry topside or onshore locations. More specifically, the invention relates to equipment for electric power transmission to subsea loads that can be located far away from surface platforms or shore and require high power transmission. Said loads are typically motors for pumps and compressors which require control of rotational speed by control of the electric frequency.

The invention come to grips with the problems caused by the Ferranti effect and the skin effect, thereby opening up for longer subsea step out lengths than previously achievable.

BACKGROUND OF THE INVENTION AND PRIOR ART

Over the last decades global energy consumption has increased exponentially and no end can be seen for the increased demand. Whereas exploitation of fossil fuels was previously focused on onshore fields, the limited amount of oil started serious efforts to find and exploit offshore gas and oil fields. Presently the state of the art for production from offshore fields is by use of fixed or floating manned platforms, and by tie-in of subsea production templates with subsea wells to these platforms. In some cases production is routed directly to an onshore receiving facility without a platform. In order to maintain a sufficiently high production from subsea satellites to a central platform or directly to shore, pressure boosting can be provided by using a multi-phase pump or by separation followed by pumping and compression. Pumps have also been installed at seabed for direct seawater injection into the reservoir for pressure support for enhanced oil production.

There are several advantages that motivate for subsea location of pumps and compressor stations compared to location on platforms:

Safety for people by not working and living on platform and not being transported by helicopters to and from No risk of fire and explosion No risk for blow-out from production risers up from seabed to platform and from platform to seabed Security against sabotage Cost saving both for capital and operation, i.e. reduced production cost for oil and gas Increased production because the suction effect of compressors and pumps is closer to the wellheads The equipment has stable ambient conditions, i.e. almost constant, cold temperature and almost constant, low flow seawater current velocity around the equipment and no waves, while the temperature at platforms can vary from e.g. −20° C. to +30° C. and the wind velocity can be at hurricane strength combined with extremely high waves.

The cold seawater can be utilized for cooling of motors and other electric and electronic equipment and process fluids No visual pollution Considerably lower weight and thereby lower material and energy amount for fabrication of a subsea plant Lower carbon dioxide, i.e. climate gas emission for fabrication due to less material amount Less carbondioxide emissions during operation due to elimination of helicopter transport and operation of platform Less carbondioxide emission compared to platforms due to electric motors for running compressors and pumps and supply of electric power from shore or platform Less energy consumption and climate gas emission per weight unit of oil and gas The disadvantage for subsea compressors per 2010 is that none has been installed and operated subsea, i.e. the technology is not proven. However, this is just a question of time, and the first subsea compressor station will probably be in operation in 2015 or earlier due to the strong motivation for this application.

Subsea pressure boosting is a recent technology. Subsea pressure boosting requiring a significant subsea step out length is a very recent technology using modern equipment and facing problems that are not met or is irrelevant elsewhere.

State of the art technology is defined in patent publication WO 2009/015670 prescribing use of a first converter arrangement in the near end, the topsides or onshore end, of a subsea step out cable and a second converter arrangement in the far end, the subsea remote end, of the subsea step out cable. A variable speed drive, VSD, is prescribed in either end of the step out cable. Subsea variable speed drives (VSD) for electric motors is also called variable frequency drive (VFD) or Adjustable Frequency Drive (AFD) or frequency converters or just converters and they represents state of the art technology. Neither in WO 2009/015670 or other publications is the Ferranti effect mentioned, nor is any problems associated with subsea VSDs discussed or indicated.

So far only a few subsea pumps and no subsea compressors are in operation. Subsea compression stations are however being developed and the first expected to be installed and in operation within some few years. Currently, subsea pumps and compressors are all driven by asynchronous motors. The step-out distance of installed pumps is not more that about 30 km from platform or shore and so far the depths are not below 1800 m. It is known that serious studies and projects are conducted by the oil industry aiming at installation of compressors at a step-out distance in the range of 40 to 150 km and at water depth down to 3000 m or more.

A realistic motor power is from about 200 kW for small pumps and up to 15 MW for compressors and in the future even larger motors can be foreseen. Subsea motors that are presently installed are supplied with power via AC (alternating current) cables from the location of the power supply, i.e. platform or shore, and in case of several motors each motor has its own cable and frequency converter (Variable Speed Drive, VSD) at the near end of the cable in order to control the speed of each individual motor at the far end of the cable, ref. FIG. 1 and Table 2.

In the context of this patent description near end means the end of the power transmission near to the power supply. In subsea applications this is topsides platform location or onshore. Correspondingly, the far end refers to the other end of the transmission line close to the power loads, typically motor loads. Far end is not necessarily restricted to the high-voltage end of the transmission line. The term can be extended to busses or terminals of lower voltage which are part of the far end station such as e.g. a common subsea bus on the low-voltage side of a subsea transformer.

Compressors and pumps are often operated at maximum speeds between 4000 to 14000 rpm and 2000 to 5000 rpm, respectively. Thus the driving electrical motor has to have a rated speed in the order 2000 to 14000 rpm when using modern high speed motors without a gearbox between the motor and the pump or compressor. This mechanical speed corresponds to an electrical frequency range for the feeding drive of about 30 to 230 Hz for the example of a two-pole motor. Motors with more pole pairs would allow for lower maximum mechanical speed for the same electrical frequencies.

FIG. 1 illustrates the only solution so far used for transmission of electric power to installed pumps, in some cases without transformers between VSD and subsea motors, and this is referred to as First solution. This solution with one transmission cable per motor has the disadvantage of becoming expensive for long step-out; say more than 50 km, due to high cable cost.

A serious technical obstacle against this solution is that at a certain subsea step-out length, the transmission of electric power from a near end power source to a far end distant motor is not feasible because the transmission system will become electrically unstable and inoperable due to the Ferranti effect that later will be described. The innovation will resolve this problem of instability.

Figure 2:
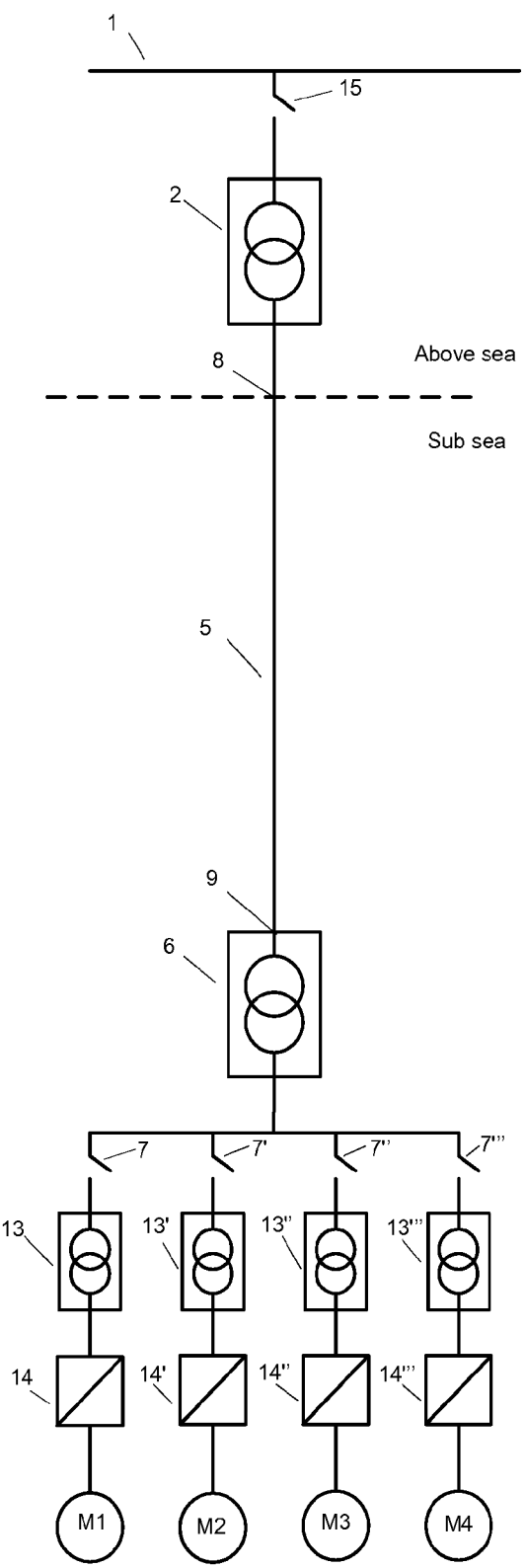

FIG. 2 illustrates a solution that has been proposed for transmission of electric power to several loads at long step-out, Solution Two. This solution with one common transmission cable and a subsea power distribution system including one subsea VSD (Variable Speed Drive) per motor, will considerably reduce the cable cost for transmission, and also prevent the problem of electric instability by limiting the frequency of the current in the transmission cable to say 50-10 Hz, and the skin effect is also acceptable for such frequencies. The frequency is then increased by a VSD to suit the speed of the motor connected to the VSD. The Second Solution has however also disadvantages. These are expensive VSDs which are not proven for subsea use, and because such VSDs are composed of many electric and electronic components included a control system, they are susceptible to contribute to an increased failure rate of the electric transmission and subsea distribution system.

In the following will be described the inherent electrical problems of the existing First Solution (FIG. 1), with one motor at the far end of a long cable, and a Third Solution illustrated in FIG. 3 with several motors at the far end of a common long transmission and a common VSD at the near end.

For a long step-out distance from the power supply to the load, in the order of 50 km and above, the influence of the subsea cable is so strong that such a system has not been built yet for a limited load such as a single motor. The line inductance and resistance involve a large voltage drop from the power supply to the load. It is known that such a voltage drop is self-amplifying and can result in zero voltage at the far end. The longer the step-out distance the higher the transmission voltage has to be in order to reduce the voltage drop along the transmission line. However, a cable has a high capacitance and a long AC (alternating current) cable will exhibit significant so-called Ferranti effect. The Ferranti effect is a known phenomenon where the capacitive charging current of the line or cable increases with the line length and the voltage level. At a step-out length of 100 km the charging current in a cable can be higher than the load current, which makes it difficult to justify such an ineffective transmission system. A more critical result is that the sudden no-load voltage will be about 50% higher than the near end supply. Such highvoltage would destroy the cable and the far end transformer and connections. At a sudden load drop the far end voltage will jump to this high level. In addition there will be a transient peak of e.g. 50% giving like 100% in total, see Table 1 below where values marked with fat italic letters are above the voltage class margin of the insulation.

Today's systems with step-out distances in the order 30 km have not this problem, because the subsea step-out length and electric load in combination is still feasible.

TABLE 1

Voltage rise at load trips due to Ferranti effect in different systems

| Far end shaft power | Max. transmission frequency $f_{max}$ and motor speed $\omega_{max}$ | Step-out length | Standard cable | Source voltage at near end U | Full-load and no-load voltage U | Far end transient voltage peak $u_p$ after full-load trip |
|---|---|---|---|---|---|---|
| Pump 2.5 MW First Solution | 60 Hz (3600 rpm) | 40 km | 95 mm² 30(36) kV | 20 kV | 18.3 kV 20.2 kV | 20.9 kV |
| Compressor 7.5 MW First solutions | 180 Hz (10800 rpm) | 40 km | 150 mm² 30(36) kV | 32 kV | 29.2 kV 34.8 kV | *41.0 kV* |
| Pump 2.5 MW First Solution | 60 Hz (3600 rpm) | 100 km | 150 mm² 30(36) kV | 26 kV | 23.6 kV 27.5 kV | 28.9 kV |
| Compressor 7.5 MW First Solution | 180 Hz (10800 rpm) | 100 km | 150 mm² 30(36) kV | 28.5 kV | 28.8 kV *52.7 kV* | *68.4 kV* |
| Three compressors and three pumps. Total 30 MW Third solution | 180 Hz Compressor: 10800 rpm Pump: 5400 rpm | 100 km | 400 mm² 45(54) kV | 45.6 kV | 45.6 kV *unstable* | *155 kV* |

The Ferranti effect and skin effect—some considerations:

The Ferranti effect is a rise in voltage occurring at the far end of a long transmission line, relative to the voltage at the near end, which occurs when the line is charged but there is a very light load or the load is disconnected.

This effect is due to the voltage drop across the line inductance (due to charging current) being in phase with the sending end voltages. Therefore both capacitance and inductance are responsible for producing this phenomenon.

The Ferranti effect will be more pronounced the longer the line and the higher the voltage applied. The relative voltage rise is proportional to the square of the line length.

Due to high capacitance, the Ferranti effect is much more pronounced in underground and subsea cables, even in short lengths, compared to air suspended transmission lines.

A proposed equation to determine the Ferranti effect for a given system is:

$$v_f = v_n(1 + \omega \times C \times L \times l^2)$$

Where:
$v_f$=far end voltage
$v_n$=near end voltage
$\omega = 2 \times 3.14 \times f$
f=frequency
C=line capacitance
L=line inductance
l=line length
$l^2$=line length square In the literature can also be found other expressions for the Ferranti effect, but in any cases it is agreed that the effect increases with transmission frequency, cable capacitance, length of cable and voltage.

From the above equation can be concluded that the Ferranti effect of a long line can be compensated by a suitable reduction of the electric frequency. This is the reason for the Second Solution with subsea VSD. The transmission frequency can e.g. be the normal European frequency of 50 Hz.

Another benefit with low transmission frequency is a strong reduction of the electrical skin effect of the transmission cable, i.e. better utilization of the cross section area of the cable. In practice transmission of high frequency electricity, say 100 Hz or more over long distances, say 100 km or more, will become prohibitive due to the skin effect and the corresponding high resistance of the cable.

The influence of Ferranti effect and skin effect has of course to be calculated from case to case to assess whether they are acceptable or not for transmission at a given frequency. A demand exists for providing subsea electric power transmission systems that are beneficial with respect to the above mentioned problems.

FIGURES

Figure 3:
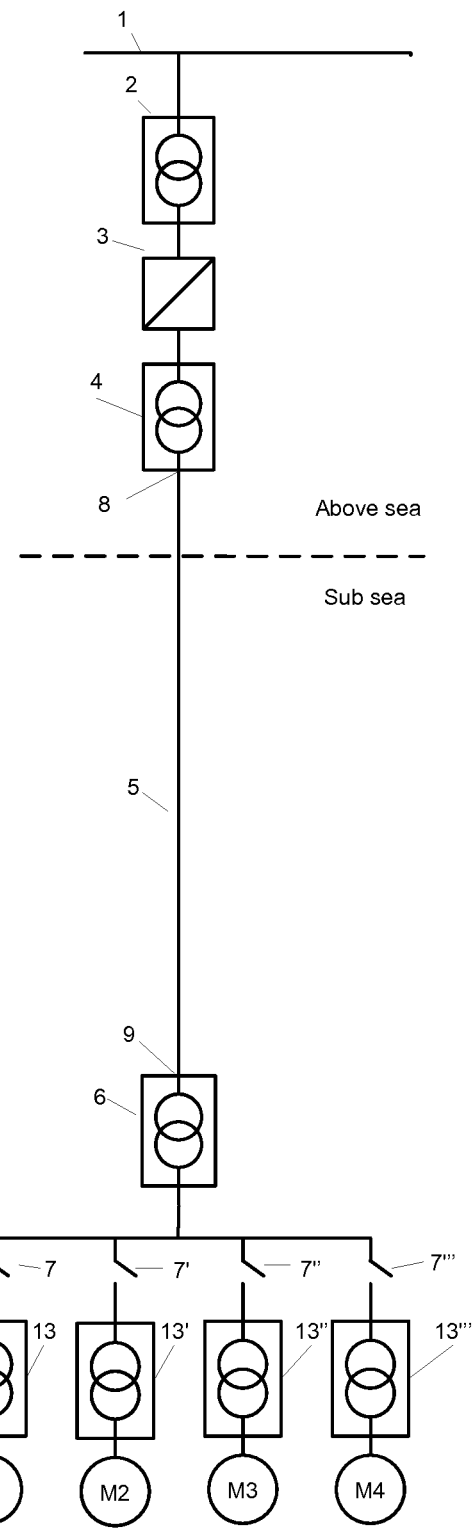

The invention is illustrated with figures, of which
FIGS. 1-3 illustrate prior art embodiments, and
FIGS. 4-7 illustrate embodiments of the present invention.

SUMMARY OF THE INVENTION

The invention provides a device for operative connection between a subsea step out cable far end and subsea loads such as pumps, compressors and control systems, distinctive in that the device is a rotating frequency stepper device, more specifically a rotating step up or step down device, and it comprises:
  a motor and a generator operatively connected so that the motor drives the generator,
  at least one gas and/or liquid filled vessel into which at least one of the motor and generator are arranged, and
  the step out length is long, which means long enough to cause problems due to the Ferranti effect at frequency and power levels feasible for subsea pump and compressor motors, and where the device via the step out cable receives input electrical power at a low enough frequency to have stable transmission and the device, operatively connected to the subsea motor, delivers an output electrical frequency, amperage and voltage feasible for operation of the connected motors.

The device is preferably a passive frequency step up device or frequency step down device, having no means for active control or adjustment on site subsea, and it comprises: a rotatable shaft having a motor arranged; a generator arranged on the motor shaft or on a different shaft operatively connected to the motor shaft; a pressure vessel into which the motor, generator and shafts are arranged; a gas and/or liquid filling the pressure vessel, at least one electric penetrator and a pressure compensator if the vessel is filled with liquid that is to be pressure compensated to the ambient seawater pressure. The frequency step down can be all the way down to 0 Hz, the frequency step up can be up to the operating frequency of the connected loads.

More preferably the device is a Subsea Rotating Frequency Step-up Device (SRFSD) comprising an electric motor coupled to a generator for subsea location at a far end of a subsea step out cable connected to at least one power source at the step out cable near end at a dry location onshore or topsides, and the step out length is long, which means long enough to cause problems due to the Ferranti effect at frequency and power levels feasible for subsea pump and compressor motors, and where the device via the step out cable receives input electrical power at a low enough frequency to have stable transmission and the device, operatively connected to the subsea motor, delivers an output electrical frequency, amperage and voltage feasible for operation of the connected motors and the device is installed in a pressure vessel or housing that is filled with liquid or gas.

Most preferably the device comprises an electric motor and an electric generator having a common shaft, the pole number of the generator is a multiple of the pole number of the motor. Alternatively the device comprises one of: a mechanical gear, a fluid-dynamic or hydraulic gear, a mechanical fluid dynamic gear or a magnetic gear.

No earlier subsea pressure boosting systems has taken into consideration the Ferranti effect. The earlier system version with a subsea VSD can therefore be useless for many applications since the insulation of the step out cable can be damaged by uncontrollable high voltage at the far end due to the Ferranti effect. The feature a "passive electric frequency step up or step down (or stepper) device", relevant for some embodiments, means that the device shall not and can not be adjusted on site during operation or any time during the service life of the system, the device is a passive slave unit, namely a passive frequency step up device or a passive frequency step down device, contrary to a subsea VSD. A subsea VSD is very complex, large and expensive, it is typically about 12 m high, 3 m in diameter and weights about 200 tons. The passive device will to the contrary be much smaller and simpler, being typically about 6 m long and 2-3 m in diameter, weighting about 50 ton. The reliability of the device is estimated to be several times better than for a subsea VSD. This is because a subsea VSD is very complex, and even though all components are of top quality the large number of components and the complexity results in a reduced reliability in practice. The cost of the device or a system of the invention will be significantly reduced compared to the state of the art systems having a subsea VSD. The term other loads comprises power to control systems and other loads not necessarily related to pressure boosting.

The operation frequency of the step out cable must be considered taking into account the Ferranti effect and the electrical losses. The insulation is a key element. Most preferably, the dimensions of conductors and insulation, and choice of operation frequency, are so that at the far end of the cable, the Ferranti effect, at its maximum during operation, increases the voltage just as much as the electrical losses, hence overvoltage at the far end due to the Ferranti effect is avoided and the cable design is simplified. The guidance provided in this document, combined with good engineering practice, is assumed to be sufficient for proper step out cable design, including choice of operation frequency: The solution should be found in each case. The device of the invention is then designed in order to transform the operation frequency of the step up cable to the operation frequency of the subsea loads, i.e. subsea compressors or pumps, or more specifically, the motors of the subsea compressors or pumps.

Further embodiments and features are defined in the dependent claims. The features described or illustrated in this document can be included in the device of the invention in any operative combination, and each such combination is an embodiment of the invention. The motivation for such combinations is based upon what is described or illustrated or the combinations are obvious for persons skilled in the art after having studied this document thoroughly.

The input and output electrical frequency of the device will be different. The difference will be at a fixed ratio for passive devices. The input frequency, the operation frequency of the step out cable, will be in the range 0.1-150 Hz, such as 2-60 or 4-50 Hz or 5-40 Hz, whilst the output frequency will be in the range 0.1-350 Hz, such as 30-300 Hz, 50-250 Hz or 50-200 Hz. The output frequency can also be 0, i.e. direct current (DC) by using a DC generator in the motor-generator set. The subsea device can be arranged in one or several housings, as one or several elements, however, all parts of it must withstand the harsh subsea environment without failure. With the present invention, the long term cost and reliability of said device, and associated systems, improve significantly over what is currently achievable with for example subsea solid state variable speed drives.

The invention also provides a system for pressure boosting of hydrocarbon fluid or other fluid subsea, comprising
    a subsea step out cable, connected to a an electric AC power source at a near end, the length of the subsea step out cable is too long for stable operation at frequency and power level feasible for subsea pressure boosting equipment,
    subsea motors for pumps or compressors operatively connected to a far end of the subsea step out cable,
    distinctive in that the system further comprises: a rotating motor-generator frequency step up device arranged between the subsea step out cable and subsea pumps or compressors.

Preferably, the device of the system has no means for active control or adjustment on site subsea, and it comprises:
    a generator arranged on a motor shaft,
    a vessel into which the motor, generator and shaft are arranged,
    a liquid filling the vessel,
    a pressure compensator, and
    at least one electric penetrator.

In addition, the invention provides use of a subsea rotating stepper device of the invention for transforming the electrical power characteristics of a subsea step out cable to an electric power characteristic feasible for operation of connected subsea equipment, a system with at least one subsea stepper device of the invention arranged in the far end of a subsea step out cable, and a method of operating said system, by control adjustments only for system items at dry topsides or onshore locations, such as by a topsides VSD. Either one of the device, the system, the method or the use of the invention, may comprise any features or steps as herein described or illustrated, in any operative combination, each such operative combination is an embodiment of the invention.

The Embodiment of the Invention with Frequency Step-Up to Run AC Motors

Figure 4:
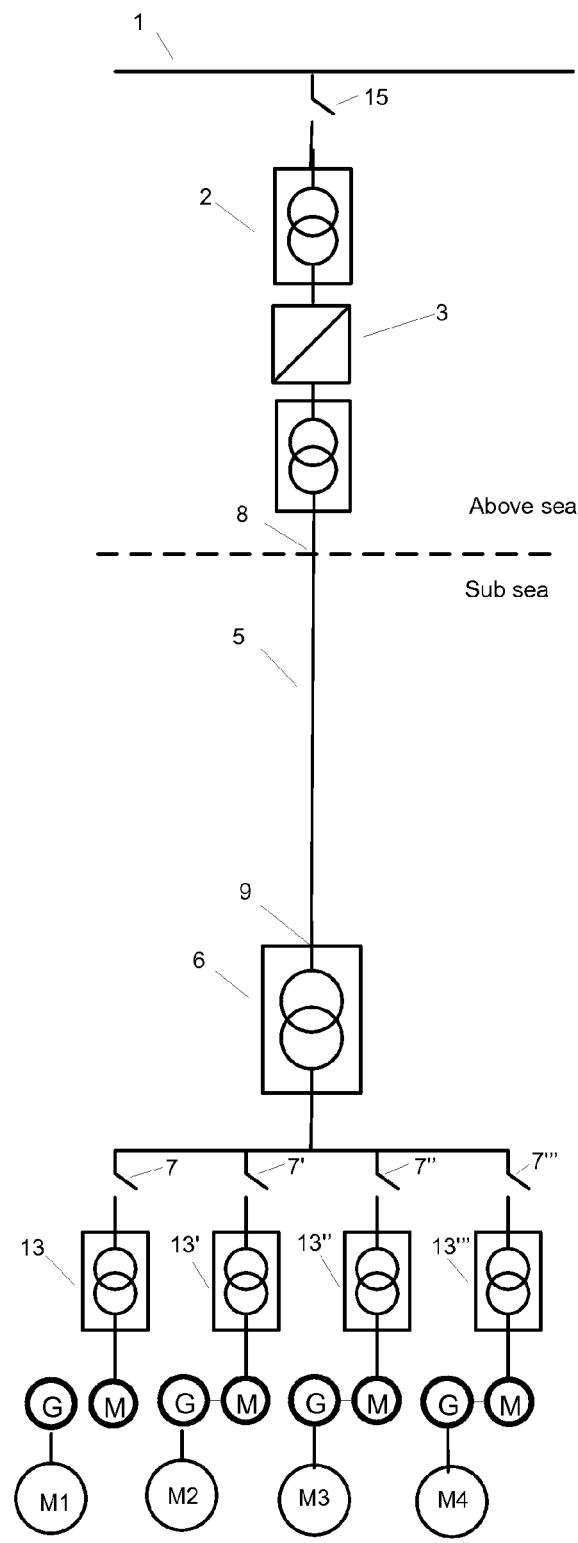
Figure 5:
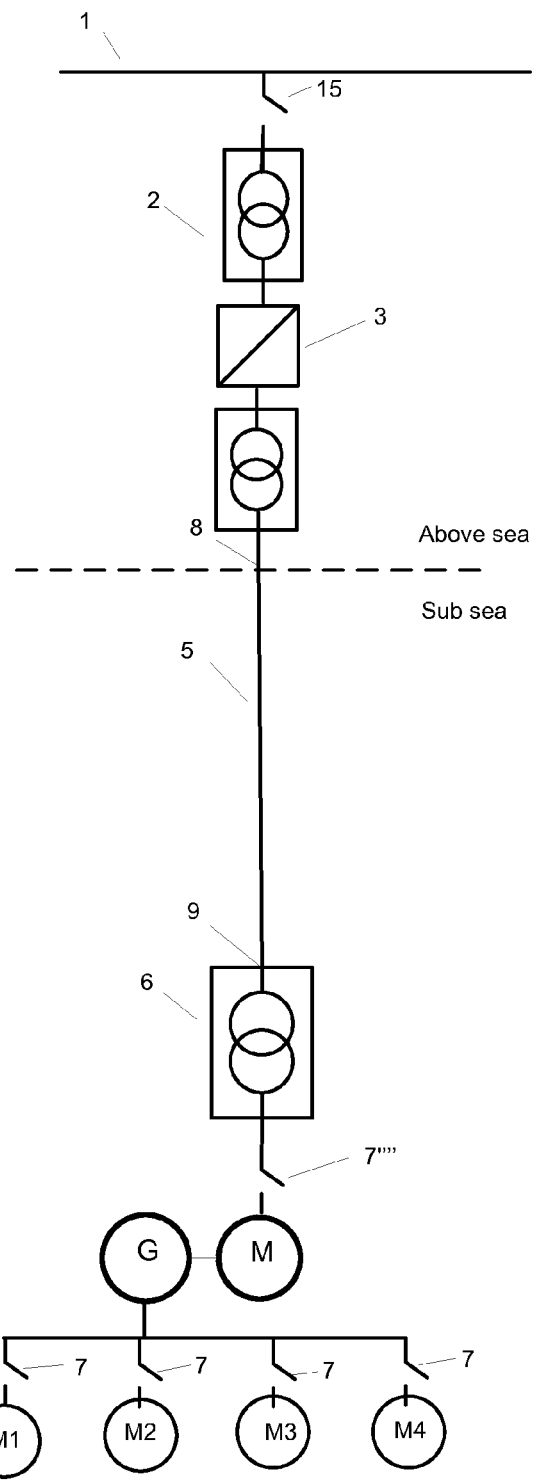
Figure 6:
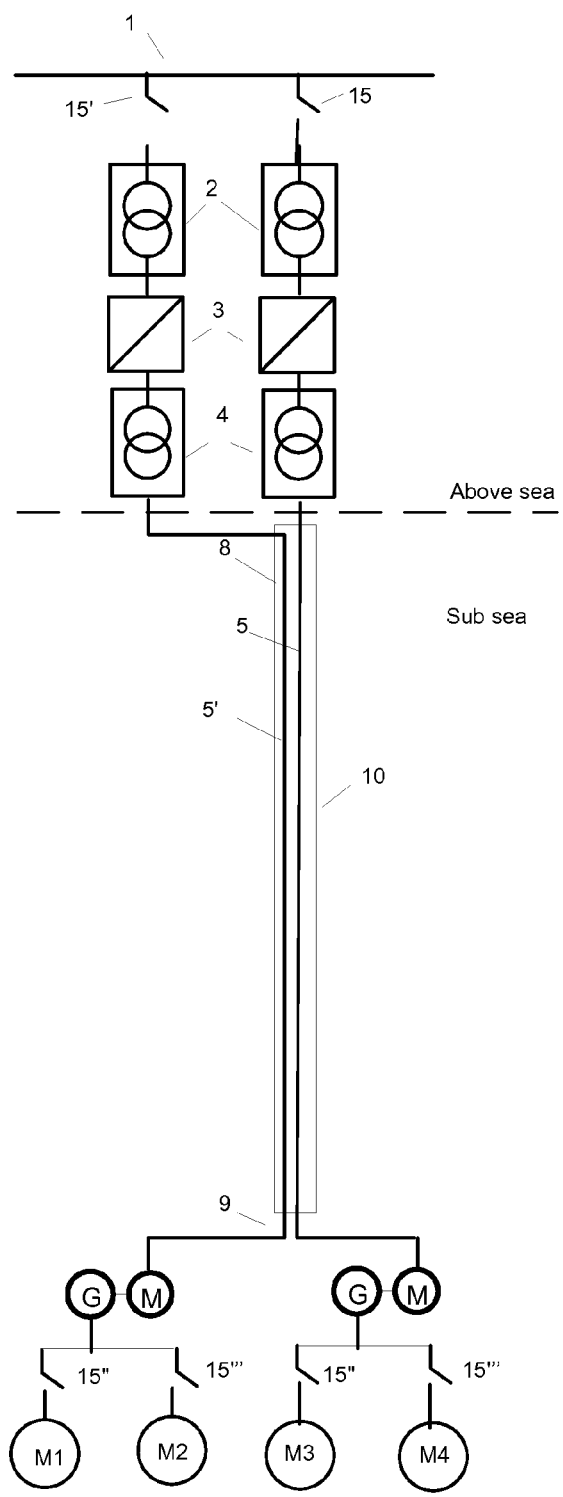

An embodiment of the invention, the Fourth Solution is shown in FIGS. 4 and 5. The main feature of the embodiment is introduction of a subsea frequency step up or step down device, in the illustrated embodiment a frequency step-up device (FSD) located subsea at the far end of the transmission cable and at a short distance to the motors that runs the compressors and pumps. Short distance means in this context near enough to keep acceptable the ohmic resistance drop and thereby power loss between the generator/FSD and the motors, and it also means short enough to avoid problems caused by Ferranti effect and instability. It is important to note that the subsea FSDs are not directly controlling the frequency to suit the operational speed of motors by having a local control system that adjusts the speed according to needs. The variation of speed according to steady state production need, start and stop and ramping speed down and up, is done by the near end surface (topsides on platform or onshore) located VSD or by other means far from the subsea FSDs. The FSDs are simply slaves of the VSD and their purpose is only stepping-up the transmission frequency given by the VSD by some multiple.

This step-up is easiest obtained by using a subsea electric motor which shaft is coupled to a subsea electric generator and both machines running with same speed, i.e. a subsea rotating FSD (RFSD). Any type of coupling (e.g. flexible, rigid, common shaft of motor and generator, hydraulic, fluid coupling) can be used that gives the same speed of motor and generator. The motor should preferably have 2-poles to keep the transmission frequency as low as possible, while the generator's number of poles will be chosen according to the need for step-up from a transmission frequency that is low enough to not give the above described problems caused by Ferranti effect, instability and high resistance due to skin effect with corresponding unacceptable voltage drop; i.e. within a "problem free frequency range".

By having a 2-pole motor and a 4-pole generator the step-up ratio will be 2:1, a 6-pole generator will give a ratio of 3:1 and an 8-pole generator 4:1 and so on dependent of the number of poles of the generator. This means that if the frequency from a surface VSD is in the range of 50 the subsea frequency from the subsea RFSD device will be in the range of 100 Hz corresponding to a revolutionary speed of 2-pole motors from 6000 rpm. If using an 8-pole generator the corresponding stepped-up frequency will be in the range of 200 and the speed of a 2-pole motor 12000 rpm. These examples clearly demonstrate that the invention can supply any needed frequency for realistic motor speeds by a correct combination of poles of motor and generator of the rotating subsea RFSD and at a problem free transmission frequency.

Generally the step-up ratio can be expressed:

$$f_{s\text{-}u} = n \times f_t, \text{ where}$$

$f_t$: transmission frequency, Hz
$f_{s\text{-}u}$: stepped-up frequency=input frequency to motors, Hz
n: multiple 2, 3, 4 and so on dependent of number of poles of the generator compared to the motor The problem free frequency range must be calculated from case to case. For step-out distances of up to say 150 km a transmission frequency of up to say 75 Hz could be within the problem free range which will give a 2-pole compressor motor speed of 2×7×60=9000 rpm if the step-up ratio is 2:1 (2-pole motor and 4-pole generator). If 75 Hz is found to be to high to be problem free, a step-up ratio of 3:1 (2-pole motor and 6-pole generator) can be applied, which for the given example will reduce the transmission frequency to maximum of 50 Hz. The transmission frequency will not stay constant over the whole production period of the oil or gas field, but have to be adjusted up over time as the pressure at the wellheads decreases. For a given case the transmission power from the near end could be 33.3 Hz by the beginning and 50 Hz by the end of production corresponding to a speed of between 6000 and 9000 rpm of a 2-pole compressor motor at the far end.

By selecting the right step-up ratio by selection of poles of motor and generator, it will probably be possible to transmit AC power problem free to subsea motors with a distance from the near end to the far end (step-up distance) of 300 km or more.

Use of a 2-pole motor is beneficial to keep the transmission frequency as low as possible. If there of other reasons, e.g. torque and power, should be found favourable to use a motor with higher number of poles, it is still possible to get a desired step-up by selecting the number of poles of the generator correspondingly, e.g. 4-pole motor and 12-pole generator will give a step-up ratio of 3:1.

An advantage by using low frequency and 4-poles motor is that the speed of the motor and generator will be low and so will be the corresponding frictional losses in the motor. This opens for use of oil filled motor and generator arranged in common pressure housing, If for instance the transmission frequency is 25 Hz and a 4-pole motor is used the rotational speed will be only 750 rpm, which will result in low frictional losses. To achieve a frequency of 150 Hz from the generator, this has to be 24-pole. By varying the transmission frequency from 18 to 28 Hz, the frequency from the generator will vary in the range from 108 to 168 Hz and give motor speed (2-pole) of 6480 to 10080, which could be suitable for a compressor motor.

The selection of the region of the variable transmission frequency and the consequential necessary step-up ratio will therefore be based on a low enough frequency to have a stabile transmission for the given step-out distance and keep the Ferranti effect and skin effect low combined with a suitable number of poles and torque of the motor and the generator. Additionally, if oil filled motor and generator are preferred, the speed must be kept below some limit to avoid too high frictional losses; typically could a speed of 750 to 1500 rpm be favourable, i.e. a transmission of 25 Hz to obtain 750 Hz for 4-pole motor and 1500 rpm for 2-pole motor.

Below is given as an example a table that shows the resulting speed of a subsea compressor drive (motor) with 2-poles by using a motor-generator set with 4-poles motor and 12-poles generator:

| Transmission frequency, Hz | Speed of 4-poles motor, rpm | Output frequency from 12-poles generator, Hz | Speed of 2-poles compressor drive, rpm |
| --- | --- | --- | --- |
| 5 | 150 | 15 | 900 |
| 10 | 300 | 30 | 1800 |
| 20 | 600 | 60 | 3600 |
| 25 | 750 | 75 | 4500 |
| 30 | 900 | 90 | 5400 |
| 40 | 1200 | 120 | 7200 |
| 50 | 1500 | 150 | 9000 |
| 60 | 1800 | 180 | 10800 |
| 70 | 2100 | 210 | 12600 |
| 80 | 2400 | 240 | 14400 |

The table demonstrates that a transmission frequency range up to 50 Hz will cover the most actual speed range for compressors.

A similar table is given below for a compressor drive with 2-poles, a 6-poles motor for the motor-generator set and 24-poles generator:

| Transmission frequency, Hz | Speed of 6-poles motor, rpm | Output frequency from 24-poles generator, Hz | Speed of 2-poles compressor drive, rpm |
| --- | --- | --- | --- |
| 1 | 20 | 4 | 240 |
| 5 | 100 | 20 | 1200 |
| 10 | 200 | 40 | 2400 |
| 20 | 400 | 80 | 4800 |
| 25 | 500 | 100 | 6000 |
| 30 | 600 | 120 | 7200 |
| 40 | 800 | 160 | 9600 |
| 50 | 1000 | 200 | 12000 |
| 60 | 1200 | 240 | 14400 |
| 70 | 1400 | 280 | 16800 |

In this case a transmission frequency of up to 40 Hz will be sufficient.

The above tables clearly demonstrate that the transmission frequency can be kept low to avoid problems caused by Ferranti effect and skin effect.

Selection of compressor bundle is also a factor that helps to give freedom in selection of transmission frequency and frequency step-up ratio, i.e. a bundle can be selected, within reasonable limits, to suit an $f_{s-u}$ resulting from an optimum transmission system.

A subsea RFSD is in principle quite simple and no control system is need because the stepped-up frequency will be automatically obtained as a result of the ratio of poles of the generator relative to the poles of the motor of the RFSD.

Another advantage with a subsea rotating step-up device is that the output current and voltage will have a practically perfect sine wave form which is beneficial for the motors, i.e. no electric filter for smoothening is needed to obtain this.

The subsea RFSD (SRFSD) also supplies inductance to the transmission system, which due to the cable has a surplus of capacitance, and the SRFSD therefore reduce the need for near end electric phase compensation.

There will be some power loss in a SRFSD, say 5%, but a subsea VSD will also have losses, however perhaps lower.

The selection of SRFSD must of course be such that the output power of the generator at a given frequency is such that it corresponds to the demand of the connected motor(s). If for instance a 2-pole compressor motor shall give 10 MW at 10000 rpm, the power output of the generator must be accordingly plus a little additionally to cover for losses at a frequency of 167 Hz. The motor of the SRSFD must correspondingly give a shaft power of 10 MW plus some additionally to cover for losses.

Another way than having different poles of the motor and generator of the motor-generator set, can be to include a fixed step up gear between the motor and the generator, e.g. of 3:1. If the transmission frequency for instance is 50 Hz, a 4-poles motor will have a speed of 1500 and the generator speed will be 4500 rpm with an output frequency of 150 Hz that gives a 2-poles compressor drive a speed of 9000 rpm. A combination of fixed step-up and number of generator poles can also be used to keep the number of poles down if favourable. If for example a step-up gear with ratio 2:1 is inserted between a 4-poles motor and an 8-poles generator, the speed of the motor at 50 Hz will be 1500 rpm, the speed of the generator 3000 rpm and its frequency output 200 Hz and the speed of the drive 112000 rpm. By having VSD at the near end the speed of the drive can be adjusted to suitable values by adjusting the transmission frequency in the range up to 50 Hz.

In some cases can be kept a fixed transmission frequency and thereby a fixed frequency from the generator and hence a fixed speed of the connected motor, e.g. compressor, multiphase or single phase pump motor. If the motor runs a compressor, the compressor speed can for instance be kept constant at 9000 rpm, and a suitable flow capacity and pressure ratio of the compressor, which will vary over time, can be adjusted by rebundling and some recirculation. This will give the simplest and lowest CAPEX of the total system, but with somewhat higher power losses due to periods with recirculation on the compressor. A more frequent rebundling of the compressor may also be necessary compared to variable frequency. An optimum power transmission and compression system must be based on calculations to establish optimum system design from case to case.

Design of Subsea RFSD
Oil Filled Pressure Housing

The motor and generator are assembled in a common pressure housing with a suitable number of flanges with seals. Further there are several options for the practical design, which are listed in the following:

The motor-generator has a suitable number of bearings.

The rotational speed of the motor-generator is low enough to keep the frictional losses acceptable, and the common pressure housing is filled with a suitable liquid, e.g. oil, that lubricates the bearings and also cools motor and generator and the properties of the selected oil should preferably be such that it serves as electric insulator.

Instead of oil, the housing can be water filled with water or a mix of water and antifreeze agent, e.g. MEG, which requires a complete electrical insulation of the motor and generator windings.

The pressure inside the housing can be selected freely by not filling it completely with liquid and have a gas volume at some pressure.

A favourable solution is to fill the housing with liquid and have pressure balancing device between the ambient seawater and the internal liquid of the pressure housing. This will result in a minimum thickness of the pressure housing and also reduce the load and requirements to flanges and seals If the direct cooling of the motor-generator by heat flow through the pressure housing and to the sea is too low, has to be included an external cooling circuit with heat exchange to the ambient seawater.

The pump for the cooling circuit can favourably be coupled to the motor-generator shaft or it can be a separate pump with electric motor.

If magnetic bearings for operation in liquid are available, this could be an option to liquid lubricated bearings. For more details about this, reference is made to the description below for gas filled housing.

Gas Filled Housing

The pressure housing can be filled with an inert gas, e.g. dry nitrogen or dry air. The advantage of this is lower frictional losses than for oil filled, which allows higher speed of motor-generator. Additionally the practical solution can include the following:

Liquid lubricated bearings (e.g. oil, water or water/MEG) with a circulating circuit through an external heat exchanger or only inside the housing.

Minimum one pump for the lubricant, either driven by the motor-generator shaft or a separate electric pump If necessary a cooling circuit for the gas is included by having minimum one fan to circulate the gas through an external heat exchanger or only inside the housing.

Alternatively to liquid lubricated bearings, magnetic bearings can be used. The cooling system for the gas must then be dimensioned to also cool the magnetic bearings.

A control system for the magnetic bearings must be included, located in the vicinity of the motor-generator housing or inside the housing. If the control system is located in a pod outside the motor-generator housing, penetrators through the housing wall are needed as well as wires for power and signals between the control system and the magnetic bearings. If the control system is in a pod, the pod can be designed to be separately retrievable or not.

The pressure inside the housing can be selected from in the region of one bar and up to equal to the ambient water pressure or higher. The advantage of low pressure is low friction and losses. The advantage of high pressure is that the heat capacity of the gas increases with pressure and therefore gives better cooling. Another advantage of high pressure is also reduced requirement to wall thickness and lower load on flanges and seals. If the pressure is selected close to equal to ambient seawater pressure, the resulting requirements to the pressure housing and flanges and seals will be similar to a liquid filled pressure balanced vessel.

Subsea Rotating VSD

Above is mentioned use of hydraulic or fluid coupling between the motor and the generator in the motor-generator set. Such a coupling has the advantage of giving "soft start", i.e. the generator load on the motor is not immediate, but ramps up over some time such that a high start current peak is avoided. The use of such a coupling can be further expanded to make the coupling adjustable such that the speed of the generator can be adjusted relative to the constant motor speed. In this way the motor-generator set can be used as a subsea variable speed drive, i.e. subsea rotating variable speed drive (RVSD), and the topside VSD can be omitted.

Instead of a fluid coupling can be used a mechanical gear for stepping up and down the speed of the generator, and thereby its output frequency.

If a variable coupling of some kind (fluid or mechanical) is used, the control system for the variable coupling can be in a separate pod externally to the subsea RVSD or it can preferably be surface located and preferably connected to or integrated in the overall control system for the subsea booster station, compressor station or subsea processing plant or other system with subsea motors with variable speed.

Some Considerations

One important point of the invention is that though typically a VSD is used at near end, it is not important to be able to quickly adjust the frequency of the motor loads. The motor speed is slowly adjusted over years while the reservoir is produced and the field pressure gradually decreases thus requiring increased power, i.e. motor speed. This fact allows for e.g. temporarily ramping down running motors in order to connect one more motor. Alternatively, the unused motor can be connected direct on load if calculations have demonstrated that this is feasible with respect to current peaks or other disturbances of the power transmission system. Depending on the number of already running motors it can be beneficial to temporarily reduce the frequency before the DOL (direct on-line) start. If necessary the power can be switched off when starting an additional motor and then start and ramp up the speed of all motors simultaneously. In a compression station another option is to put all pumps and compressors in recirculation before starting up a compressor or a pump that has been stopped, then start the stopped unit and when it has reached the desired speed, put all compressors and pumps on line in production mode.

The above mentioned devices and methods make it possible to manage the Ferranti effect and skin effect and thereby considerably extend the distance for stable subsea high-voltage power transmission.

Hence maximum practical step-out distance can be very much increased without introducing subsea VSDs with local subsea control of the frequency. Both in FIGS. 4 and 5 the step-up devices have not a local control system that varies the frequency and thereby the speed of motors according to the production, neither do they directly control the ramping down of frequency to add operation of motors that have been stop nor do they directly control the ramping up of the frequency to obtain the actual speed of the motors to suit the production.

If the RFSD has oil lubricated bearings, there is no need for any control system of the unit, and possible instrumentation can be limited to monitoring, e.g. vibrations and temperature, if found beneficial.

As mentioned in the section: "Background of the invention and prior art" the speed of compressors can typically range from e.g. 4000 to 14000 rpm and of pumps from e.g. 2000 to 5000 rpm. When compressor and pump motors in a compression station according to the invention (Fourth and Fifth Solution) are supplied with the same frequency by a common transmission cable, the speed of the pumps can easily be adjusted to the desired speed of half of the compressor speed by using four-pole or more pole motors for the pumps and two-poles motors for the compressors. If the pumps are used for controlling the liquid level of a separator in a compressor station, a suitable variable net forward flow for the pump can be arranged by re-circulation and equipped with flow control valves.

The speed of the pumps can therefore be controlled in the following optional ways:

Dedicated subsea FSD for each pump motor
One common FSD for several pumps motor
Running the pump motors on same frequency as the compressors, but with the double number of pole resulting in half the rotational speed
Running the pumps on the transmission frequency whilst the compressors power frequency is stepped up.

Generally, for the number of subsea FSDs, their number can be from one per motor to one big common unit for all motors or something in between, e.g. one FSD per large compressor motor and one common unit for the quite small pump motors or, as mentioned above, no FSD for the pump motors.

Figure 7:
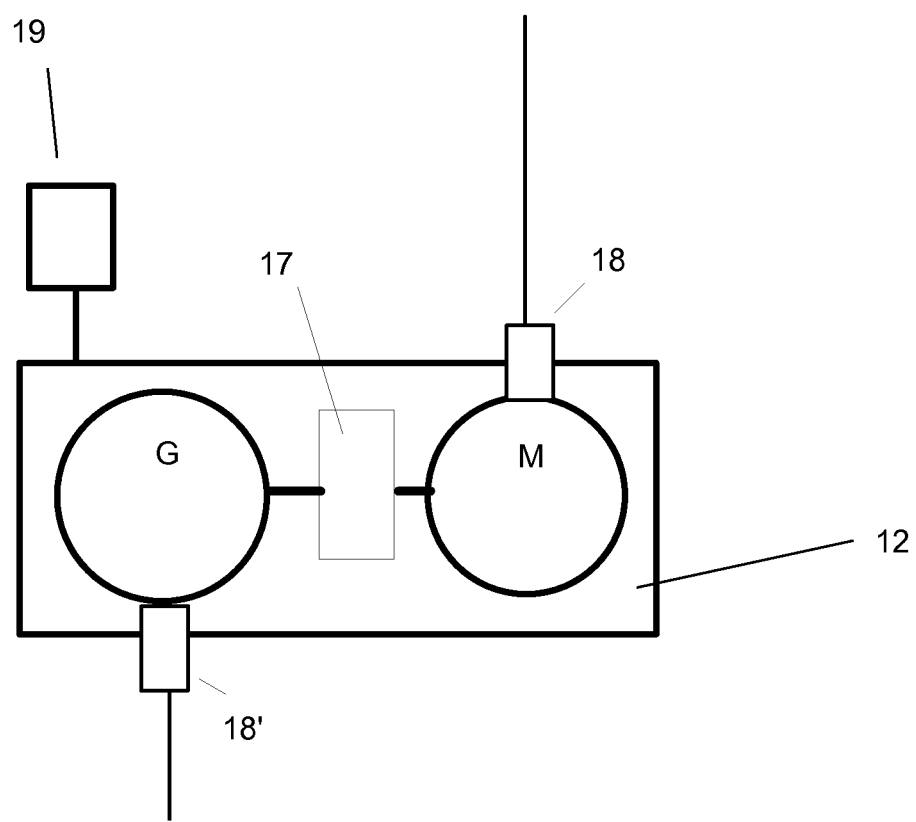

Some Suggested Combinations of Surface Located VSDs, Number of Subsea Drives and Number of 3-Phase Transmission Line A 3-phase transmission line consists of three individual cables that are insulated and bundled together. For long subsea transmission with more than one motor, e.g. two compressors, it is with present technology possible to bundle together transmission lines for two motors, i.e. six cables in the bundle. This will reduce the laying cost of the lines and has the advantage of allowing individual frequency control of two motors at the far end of the two lines that are bundled together. There is one step-up device per motor. Such an arrangement is shown in FIG. 7. In this case the motor is of the high voltage type and the transmission voltage can be e.g. 100 kV and there is no need for subsea transformers. In such case the circuit breaker has to be located after the generator where the voltage is acceptable because subsea circuit breakers for very high voltages like 100 kV are presently not available.

Another way, which results in lower investment, is the solution shown in FIG. 4 and with a hydraulic soft starter between motor M and generator G such that the motors M1-M4 can be started individually without unacceptable start currents. All motors will operate at same speed, which is not a problem for equal machines, e.g. compressors.

The less complicated arrangement is that of FIG. 4 without soft starter. In this case it will be necessary to start all compressors simultaneously, and this is a little inconvenient but not considered a problem because number of start-ups per year is limited.

In Table 2 is explained the meaning of the items in the figures.

TABLE 2

Figure labels.

| Item # | Explanation |
| --- | --- |
| 1 | Electric power supply grid |
| 2, 2', 2", 2''' | Step-down transformer |
| 3, 3', 3", 3''' | VSD, Variable Speed Drive |
| 4, 4', 4" 4''' | Step-up transformer |
| 5, 5', 5", 5''' | Transmission cable |
| 6, 6', 6", 6''' | Step-down transformer |
| 7, 7', 7", 7''' | Circuit breaker |
| 8, 8', 8", 78''' | Near end of transmission cable |
| 9, 9', 9", 9''' | Far end of transmission cable |
| 10 | Common bundle of two or more power transmission lines |
| 11 | Pressure housing |
| 12 | Inert gas or liquid |
| 13, 13', 13", 13''' | Step-down transformer |
| 14, 14", 14''', 14'''' | VSD |
| 15, 15', 15", 15''' | Circuit breaker |
| 16, 16', 16", 16''' | Rectifier |
| 17 | Fluid (hydraulic) coupling (optional), stepless fluid gear (optional) or fixed ratio gear box (optional) |
| 18, 18' | Penetrator |
| 19 | Pressure balancing unit |
| M1, M2, M3, M4 | Motor |
| M | Motor of the subsea rotating frequency step-up device (subsea RFSD) |
| G | Generator of the subsea rotating frequency step-up device |

DETAILED DESCRIPTION

Reference is made to FIG. 4, illustrating a specific embodiment of the present invention. Node 1 is connected to a source for electric power; the source is a local power grid or, for instance, a local power generation system. A VSD 3 is connection to power source. A VSD input transformer 2 is often connected in between in order to adjust the supply voltage, e.g. 13.8 kV for a platform to the rated VSD voltage, e.g. 6 kV. The transformer can be an integrated part of the VSD as offered by some suppliers. Normally a step up transformer 4 is needed to connect the VSD 3 to the high-voltage transmission line 5 that in the example of a subsea application consists of a cable. A typical voltage applied to the cable could for instance be about 120 kV. The cable is laid into the sea in order to extend from the near end 8 to the subsea far end 9; the cable has any operative length where the Ferranti effect starts being observed until where it strongly dominates to the load current. This can be translated to length in the order 20 km, to 100 km and probably beyond, dictated by the location and properties of the subsea loads. At the far end 9 of the cable, a subsea transformer 6 is arranged, stepping down the voltage to for example 20 kV suitable for the circuit breakers 7, 7', 7", 7''', followed by transformer 13, 13', 13", 13''' stepping down to for example 6 kV suitable for the motors of subsea RFSDs or the operational voltage of SFSDs, which is also a suitable voltage for the motors M1, M2, M3, M4. Four subsea motors are illustrated, which for instance could be two compressor motors M1, M2 and two pump motors M3, M4.

The step down transformers are in principle optional because the step-down transformer 6 (ref. FIGS. 4 and 5) can directly step-down the voltage suitable for the subsea FSDs as illustrated in FIG. 5. Inclusion of 13, 13', 13", and 13''' is a question of optimisation of the far end power distribution system.

The subsea RFSDs in FIGS. 4 and 5 step up the transmission frequency with a desired step up ratio by selection of poles of the motor M and Generator G.

It shall be emphasised that the key components of the power transmission systems of FIGS. 4 and 5 are the power source 1, the variable speed drive (VSD) 3, the transmission cable 5 and the motor-generator set M-G. The other components, i.e. step-up and step-down transformers, 2, 4, 6, and 14, 13', 13", 13''', and circuit breakers 15, 7, 7', 7", 7''', are included according to need from case to case.

If for instance the motor M of the motor-generator set is of the type with insulated cables in the stator it can operate at a much higher voltage than motors with conventional coils. Hence both the step down transformers 4, 6 and 13 may become superfluous. If additionally the motors M1-M4 are run at fixed sped from the step-up devices, the VSD 3 can be omitted.

Another advantage of high voltage subsea motors with insulated stator cables is that they need less current (amperes) through the penetrators through the motor housing than motors at conventional voltage in the range of 6 kV. This will allow for motors with higher power than at the present stage where around 12 MW is the maximum due to limitation in current (ampere) capacity.

Cost of long subsea cables and subsea VSDs is high, and subsea VSDs in FIG. 2 have a negative impact on system reliability as well as being expensive. One common transmission cable compared to the solution in FIG. 1 therefore represents a considerable saving in investment.

It shall be mentioned that even though one common transmission cable is beneficial of cost reasons, there is technically no problem to have one transmission cable for each subsea FSD. This may be the optimum solution for medium step out lengths, say 35 to 75 km, i.e. up to distances where the cable cost does not become prohibitive. With one VSD per transmission cable, i.e. one VSD per subsea motor, this results in individual speed control for each motor.

Condensed Description of the Invention Subsea Step-Up Device

It is problematic or even not possible to transmit high voltage high power electricity at high frequency, say more than 100 Hz, over long subsea step-up distances, say more than 40 km, to supply motors operation at high speed for subsea pumps and compressors. This is due to the Ferranti effect that can create over voltage and instability in the transmission system as well as the skin effect that creates high ohmic resistance and consequently high voltage and power losses.

Subsea variable speed drives to which the transmission frequency can be low, e.g. 50 Hz, presents a solution to this. They are however big and equipped with a large amount of sensitive, fragile electric and electronic components and control system, which additionally to making them expensive also are assumed to have a high failure rate.

The invention offers a solution to this by having the VSD with its control system at surface (on a platform or onshore) and then having one or more simple rotating subsea frequency step-up devices, near the subsea motors. These devices preferably do not directly control the frequency of the electric current to the motors, their only function is to step up the transmission frequency, which is variable and set at frequency according to the need of the motors, by a suitable ratio. In the case of rotation subsea frequency step-up devices, the resulting step-up ratio is resulting from the ratio of numbers of poles of the generator and the motor of the device. The ratio will for instance be 2 if the generator is 4-pole and the motor 2-pole.

As stated above, the preferred function of a SRFSD is purely to step-up the transmission frequency, and the variation in the output frequency is decided by a near end surface located VSD. The exception from this is if there is no VSD or similar control device at the near end. In such cases the output frequency of the SRFSD generator can be fixed or be varied within some limits by including some type of adjustable coupling or gear (e.g. a mechanical gear, a fluid-dynamic or hydraulic gear, a mechanical fluid dynamic gear or a magnetic gear) between the motor and the generator of the SRFSD.

Rotating subsea step-up devices add inductance to the transmission system and are therefore beneficial by counteracting the large capacitance of the cable, and therefore the near end compensation system can probably be reduced.

The invention claimed is:

1. A device for operative connection between a subsea step out cable far end and subsea loads such as pumps, compressors and control systems, the device comprising:
   a motor operatively connected to the step out cable;
   a generator operatively connected to subsea motors of the subsea loads, wherein the motor and the generator are operatively connected so that the motor drives the generator;
   at least one gas and/or liquid filled vessel into which at least one of the motor and generator are arranged;
   wherein a length of the subsea step out cable is long enough to cause problems at frequency and power levels feasible for subsea pump and compressor motors; and
   wherein the device is a rotating frequency step up device and is configured to, via the step out cable, receive input electrical power at a low enough frequency to have stable transmission and the device, operatively connected to the subsea motor, deliver an output electrical frequency, amperage and voltage feasible for operation of the connected motors.

2. The device according to claim 1, wherein the device has no means for active control or adjustment on site subsea, and the device comprises:
- a generator arranged on a motor shaft;
- a vessel into which the motor, generator and shaft are arranged;
- a liquid filling the vessel;
- a pressure compensator; and
- at least one electric penetrator.

3. The device according to claim 1, comprising an electric motor and an electric generator having a common shaft, a pole number of the generator is a multiple of the pole number of the motor, and the number of poles of the motor and generator is selected such that a desired frequency step-up is achieved.

4. The device according to claim 1, wherein a passive electric frequency stepper device comprises at least one of a mechanical gear, a fluid-dynamic or hydraulic gear, a mechanical fluid dynamic gear, and a magnetic gear.

5. The device according to claim 1, wherein a connection or coupling or shaft comprises a hydraulic or fluid coupling.

6. The device according to claim 5, wherein the coupling is a soft starter.

7. The device according to claim 1, wherein a variable speed drive (VSD) is connected at a near end to adjust a low transmission frequency and thereby adjust an output frequency of the generator up and down to give a desired speed of the connected motor or motors.

8. The device according to claim 1, wherein a transmission frequency from a power source at a near end is fixed.

9. The device according to claim 1, wherein a housing is filled with liquid, preferably oil or a mixture of water and antifreeze agent and have a pressure balancing device between ambient seawater and internal liquid of the housing.

10. The device according to claim 1, comprising two or more Subsea Rotating Frequency Step-up Devices (SRFSD), wherein the motors of the SRFSDs are connected to bundled transmission lines.

11. The device according to claim 1, wherein the motor of the SRFSD is of a high voltage type with insulated cables in a stator.

12. The device according to claim 1, wherein:
- a housing is filled with gas; and
- the pressure inside the housing can be selected from a region of one bar up to equal to ambient water pressure or higher.

13. The device according to claim 1, wherein the generator is a direct current (DC) generator.

14. A system for pressure boosting of hydrocarbon fluid or other fluid subsea, the system comprising:
- a subsea step out cable, connected to an electric AC power source at a near end, a length of the subsea step out cable is too long for stable operation at frequency and power level feasible for subsea pressure boosting equipment;
- subsea motors for pumps or compressors operatively connected to a far end of the subsea step out cable; and
- a rotating motor-generator frequency step up device arranged between the subsea step out cable and subsea pumps or compressors.

15. The system according to claim 14, wherein the device has no means for active control or adjustment on site subsea, and the device comprises:
- a generator arranged on a motor shaft;
- a vessel into which the motor, generator and shaft are arranged;
- a liquid filling the vessel;
- a pressure compensator; and
- at least one electric penetrator.

* * * * *